United States Patent Office 3,337,481
Patented Aug. 22, 1967

3,337,481
GENERAL PURPOSE SHOE CEMENT
James D. Singelyn, Revere, and Thomas E. Gray, Boston, Mass., assignors to Interchemical Corporation, New York, N.Y., a corporation of Ohio
No Drawing. Filed Dec. 16, 1965, Ser. No. 514,368
2 Claims. (Cl. 260—3.5)

This invention relates to a general purpose shoe cement that is effective in bonding a variety of shoe uppers with the various shoe sole materials in commercial use.

Shoe manufacturers have hitherto been compelled to use a number of different adhesives, depending on the materials to be bonded, for anchoring uppers to soles. The single adhesive of this invention can replace many of the multiple types now in use, thus reducing costs, and simplifying handling.

The cement of this invention is based upon a combination of an essentially linear polyesterurethane elastomer, a tackifying resin, a chlorinated rubber, and a copolymer of vinyl chloride and vinyl acetate, all in solution in a relatively inexpensive mixed solvent, mainly acetone, toluene and methylethyl ketone.

The polyesterurethanes used are tough, essentially linear elastomers that are thermoplastic, extrudable, moldable, become molten at elevated temperatures, are substantially free of crosslinks, and are substantially soluble in dimethyl formamide. They are described in U.S. Patent 2,871,218 and comprise the reaction products obtained by heating a mixture comprising as essential polyesterurethane forming ingredients (a) one mole of an essentially linear hydroxyl-terminated polyester of a saturated aliphatic glycol having from 4 to 10 carbon atoms and having hydroxyl groups on its terminal carbon atoms and a material selected from the group consisting of a dicarboxylic acid of the formula HOOC—R—COOH where R is an alkylene radical containing from 2 to 8 carbon atoms and its anhydride, said polyester having an average molecular weight between 600 and 1200 and having an acid number less than 10, and (b) from about 1.1 to 3.1 moles of a diphenyl diisocyanate having an isocyanate group on each phenyl nucleus in the presence of (c) from about 0.1 to 2.1 moles of a saturated aliphatic free glycol containing from 4 to 10 carbon atoms and having hydroxyl on its terminal carbon atoms, the molar amount of said polyester and said free glycol combined being essentially equivalent to the molar amount of said diphenyl diisocyanate whereby there are essentially no unreacted groups of the class consisting of isocyanate and hydroxyl groups in said reaction product.

The polyesterurethanes may be made, for example, by melting a mixture of 1447 grams of hydroxyl poly (tetramethylene adipate) and 109.6 grams of butanediol-1,4 in a 4-liter kettle and stirring with a spiral ribbon stirrer for about 20 minutes at a pressure of 5 to 6 mm. at 100 to 110° C. There is then added 730 grams of diphenyl methane-p,p'-diisocyanate. The mixture is stirred for about 1 minute and is then poured into a lubricated 1-gallon can that is promptly sealed with a friction top and heated in a 140° C. oven for 3½ hours. The hydroxyl poly (tetramethylene adipate) used has a molecular weight of 849, a hydroxyl number of 130.4 and an acid number of 0.89.

Another example is carried out by melting a mixture of 2323 grams of hydroxyl poly (tetramethylene adipate) and 219.52 grams of butanediol-1,4 in a heated autoclave and stirring for 15 minutes at 100 to 105° C. under 10 mm. pressure. 1178.7 grams of diphenyl methane-p,p'-diisocyanate is added to this mixture, which is then stirred for 2 minutes and poured into polytetrafluoroethylene-lined metal trays and placed in a 140° C. oven for 3 hours. At the end of this time the product is cooled. The hydroxyl poly (tetramethylene adipate) used has a molecular weight of 1010 and a hydroxyl number of 106.1.

The adhesives of this invention have the bonding strength, the heat activation, and other properties required by the shoe industry. They are effective on most of the common types of shoe uppers and soles in current use in shoe manufactories, such as leather, rubber, some vinyls, or composition soles with fabric, leather, some vinyls, and other types of uppers. In the examples and claims, parts and percentages are on the weight basis.

Example 1

| | Parts |
|---|---|
| Polyesterurethane, described above | 42.90 |
| Parlon R20 | 9.87 |
| MR 74 | 23.60 |
| Vinylite VYNS-3 | 6.44 |
| Drapex 6.8 | .03 |
| 55D33 | 17.16 |

These materials were dissolved in a mixed solvent consisting of

| | Parts |
|---|---|
| Methylethyl ketone | 75.19 |
| Dimethyl sulfoxide | 6.02 |
| Toluene | 18.79 |

For good working consistency, this stock batch may be reduced with the solvent to a solids content of, say, 28%. For extruder application a viscosity of, for instance, about 2500 cps. is suitable.

Example 2

| | Parts |
|---|---|
| Polyesterurethane, described above | 14.93 |
| Parlon R20 | 2.93 |
| Vinylite VYN-S | 2.44 |
| Drapex 6.8 | 0.11 |
| Copolyester A | 12.24 |
| Tetra-Phene S-700 | 8.35 |

These ingredients were dissolved in 59 parts of methylethyl ketone. Solids content was 41.0% and the viscosity 10,000 cps.

Example 3

A mixture of

| | Parts |
|---|---|
| Polyesterurethane, described above | 12.91 |
| Parlon R20 | 2.92 |
| MR-74 | 7.16 |
| Vinylite VYNS-3 | 1.93 |
| Drapex 6.8 | .08 | was dissolved in:

| | |
|---|---|
| Acetone | 36.75 |
| Methylethyl ketone | 36.75 |
| Dimethyl sulfoxide | 1.50 |

The solids content was 25% and the viscosity was 2300 cps. This is suitable for extrusion or brushing. The applied, air dried cement was activated at 150–160° F. and the bond formed under 30–40 p.s.i. pressure.

Example 4

A mixture of

| | Parts |
|---|---|
| Polyesterurethane, described above | 14.00 |
| Parlon R20 | 2.75 |
| Vinylite VYNS-3 | 2.29 |
| Drapex 6.8 | .01 |
| Tetra-Phene S-700 | 7.75 | was dissolved in acetone 73.20 to form a solution having a viscosity of 2500 cps. and a solids content of 26.8%. Activation temperature was 160° F.

*Example 5*

A mixture of

| | Parts |
|---|---|
| Polyesterurethane, described above | 18.10 |
| Parlon R20 | 3.01 |
| MR-74 | 5.27 |
| Vinylite VYNS-3 | 2.26 |
| Vinyl stabilizer | .09 |
| Tetra-Phene S-700 | 3.77 | was dissolved in a mixed solvent consisting of:

| | |
|---|---|
| Acetone | 32.95 |
| Methylethyl ketone | 32.95 |
| Dimethyl sulfoxide | 1.60 | to form a solution having a solids content of 32.5 1.0% and a viscosity of 6000 cps. The applied, air-dried cement was heat activated at 150–175° F. and bonded under pressure at 150–175° F.

The cements of this invention can be heat activated at temperatures ranging from about 125° F. to about 225° F. and bonded under pressures of about 30 to 60 p.s.i.

The chlorinated rubber imparts adhesion to rubber stocks and improves cohesion of the cement. The vinyl copolymer and the ketone formaldehyde resin broaden the adhesive properties and promote compatibility between the chlorinated rubber and the polyesterurethane.

The solubility of the polyesterurethane is limited; but is soluble in tetrahydrofurane, methyl ethyl ketone, acetone, dimethyl formamide, cyclohexanone, dioxane, dimethyl sulfoxide, and combinations of these (generally 50/50 blends) with toluene, xylene, and methylisobutyl ketone.

It is useful to add a polymeric plasticizer for the vinyl copolymer used to reinforce resistance against "invasion" by ordinary plasticizers from bonded vinyl materials, when the latter are present.

The compositions of this invention have excellent aging properties and the bonds formed therewith are stable.

The proportions of ingredients can be varied, the preferred compositions having about 12.5 to 21.5 parts of the polyesterurethane,
2.5 to 5.0 chlorinated natural rubber,
1.5 to 3.2 of the vinyl copolymer,
4.5 to 12.0 of the ketone formaldehyde resin, and,
50 to 75 parts of a solvent for the polyesterurethane, as defined above.

To make a shoe, the upper and the sole are lightly roughened, by means of a wire wheel for example. The upper and the sole are ground until the surfaces are smooth and even, to provide good contact. The adhesive is applied to the prepared areas by brush, extrusion, or other conventional means. Only one application is required. The coatings are allowed to dry at room temperature for from 2 hours to 5 days and then preferably heated to about 150 to 175° F. The type of heat source is not critical; however, it should preferably emit fairly uniform heat. The sole is spotted to the upper and immediately put in a conventional shoe press where the bond is made by submitting the joint to a pressure of about 30 to 60 p.s.i. for about 15–30 seconds. With the bond thus formed, the shoe can be immediately handled and finished. The bond strength attains a maximum in about 5 days. The adhesive has excellent aging properties, and is unaffected by the plasticizers in the vinyls and high oil leathers.

Parlon is chlorinated natural rubber.

55D33 is a polyester of very high molecular weight believed to be based on adipic acid; it is used as a polymeric plasticizer.

Copolyester A is a linear saturated thermoplastic polyester resin made from poly (ethylene terephthalate) and ethylene sebacate as described in U.S. 2,876,725.

Tetra-Phene S–700 is a solid ketone resin of the aliphatic ketone/formaldehyde type.

Vinylite VYNS-3 is a copolymer of 90% vinyl chloride and 10% vinyl acetate, having an intrinsic viscosity of 0.79 and being soluble in ketones.

MR-74 is an aliphatic ketone/formaldehyde resin.

Drapex 6.8 is a stabilizer for vinyl chloride polymers and copolymers.

What is claimed is:

1. A cementing composition consisting essentially of about
   (A) 12.5 to 21.5 parts of polyesterurethane,
   (B) 2.5 to 5.0 parts of chlorinated natural rubber,
   (C) 1.5 to 3.3 parts of a copolymer of 85 to 98% vinyl chloride and 2 to 15% vinyl acetate,
   (D) 4.5 to 12.0 parts of an aliphatic ketone/formaldehyde resin, and
   (E) 50 to 75 parts of a solvent for said polyesterurethane, said polyesterurethane being a tough, essentially linear elastomer, thermoplastic, extrudable, moldable, and becomes molten at elevated temperatures, is substantially free of crosslinks, substantially soluble in dimethyl formamide, and comprises the reaction product obtained by heating a mixture comprising, as essential polyesterurethane-forming ingredients
      (a) one mole of an essentially linear hydroxyl-terminated polyester of a saturated aliphatic glycol having from 4 to 10 carbon atoms and having hydroxyl groups on its terminal carbon atoms and a material selected from the group consisting of a dicarboxylic acid of the formula

HOOC—R—COOH where R is an alkylene radical containing from 2 to 8 carbon atoms and its anhydride, said polyester having an average molecular weight between 600 and 1200 and having an acid number less than 10 and
      (b) from about 1.1 to 3.1 moles of a diphenyl diisocyanate having an isocyanate group on each phenyl nucleus in the presence of
      (c) from about 0.1 to 2.1 moles of a saturated aliphatic free glycol containing from 4 to 10 carbon atoms and having hydroxyl groups on its terminal carbon atoms, the molar amount of said polyester and said free glycol combined being essentially equivalent to the molar amount of said diphenyl diisocyanate whereby there are essentially no unreacted groups of the class consisting of isocyanate and hydroxyl groups in said reaction product.

2. A shoe wherein the cement holding the upper to the sole consists of a cured layer of the composition defined in claim 1.

References Cited

UNITED STATES PATENTS

| 2,685,572 | 8/1954 | Perkins et al. | 260—33.8 |
| 3,063,958 | 11/1962 | Perkins et al. | 260—38 |

MURRAY TILLMAN, *Primary Examiner.*

M. J. TULLY, *Assistant Examiner.*